(12) United States Patent
Bezot et al.

(10) Patent No.: US 12,579,836 B2
(45) Date of Patent: Mar. 17, 2026

(54) CONTACTLESS DEVICE FOR CAPTURING A BIOMETRIC PRINT

(71) Applicant: IDEMIA IDENTITY & SECURITY FRANCE, Courbevoie (FR)

(72) Inventors: Grégoire Bezot, Courbevoie (FR); Elise Le Gouil, Courbevoie (FR); Marine Peschaux, Courbevoie (FR); Joël-Yann Fourre, Courbevoie (FR); Mokrane Malek, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 348 days.

(21) Appl. No.: 18/340,353

(22) Filed: Jun. 23, 2023

(65) Prior Publication Data

US 2024/0013567 A1 Jan. 11, 2024

(30) Foreign Application Priority Data

Jul. 7, 2022 (FR) ...................................... 22 06995

(51) Int. Cl.
*G06V 40/13* (2022.01)
*G06V 10/141* (2022.01)
*G06V 10/24* (2022.01)

(52) U.S. Cl.
CPC ........ *G06V 40/1312* (2022.01); *G06V 10/141* (2022.01); *G06V 10/24* (2022.01)

(58) Field of Classification Search
CPC .. G06V 10/141; G06V 10/24; G06V 40/1312; G06V 40/1318
See application file for complete search history.

(56) References Cited

U.S. PATENT DOCUMENTS

2009/0208070 A1* 8/2009 Fourre ............... G06V 40/1312
382/124
2011/0135164 A1* 6/2011 Maurer .................. G06V 40/11
382/115

(Continued)

FOREIGN PATENT DOCUMENTS

FR         2 927 713 A1    8/2009
WO    WO 2020/181465 A1   9/2020

OTHER PUBLICATIONS

French Preliminary Search Report and Written Opinion issued Feb. 20, 2023 in French Application 22 06995 filed on Jul. 7, 2022, 10 pages.

*Primary Examiner* — Syed Haider
(74) *Attorney, Agent, or Firm* — Oblon, McClelland, Maier & Neustadt, L.L.P.

(57) ABSTRACT

The invention relates to a contactless device (1) for capturing a biometric print, said device comprising a user region (10) and an electronic compartment (20), the user region (10) being suitable for receiving a hand portion of a user according to an orientation vector (V), the electronic compartment (20) comprising lighting means and an image-acquiring device (40), the image-acquiring device (40) being oriented along an optical axis (A1) making a first angle (B1) to the orientation vector (V), the lighting means comprising a light source (31) oriented along a lighting axis (A31) such that the projection (PA31) of said lighting axis (A31) in the plane defined by the orientation vector (V) and the optical axis (A1) makes a second angle (B31) to the orientation vector (V), the first angle (B1) being smaller than or equal to eighty degrees, the second angle (B31) being smaller than or equal to eighty degrees.

18 Claims, 7 Drawing Sheets

(56)          References Cited

U.S. PATENT DOCUMENTS

| 2015/0008829 | A1 * | 1/2015 | Lurie | ...................... | F21S 8/086 |
| | | | | | 315/153 |
| 2016/0300097 | A1 * | 10/2016 | Sahin | ................. | G06V 40/1365 |
| 2020/0034601 | A1 * | 1/2020 | Zhou | .................... | G06V 10/141 |
| 2022/0327858 | A1 | 10/2022 | Tang et al. | | |

* cited by examiner

CONTACTLESS DEVICE FOR CAPTURING A BIOMETRIC PRINT

The invention relates to the field of contactless devices for capturing a biometric print, with a view to acquiring a biometric print of one hand portion of an individual, i.e. a portion such as the palm of the hand, fingers of the hand, or the entire hand.

In the prior art, contactless devices for capturing a biometric print are known, these devices being able to acquire an image of a fingerprint or palm print of an individual. The problem with contactless devices is the particularly marked presence in the acquired image of wrinkles of the skin, these introducing errors during extraction of the biometric features of the print.

Non-contactless devices for capturing a biometric print are not confronted with this problem to the same extent because the contact of the hand portion to be imaged with a planar surface such as a pane of glass flattens these wrinkles of the skin during acquisition of the image of the print.

The invention aims to solve the aforementioned problems of the prior art by providing an effective and simple device for capturing a biometric print that allows the presence of wrinkles in the image acquired by said device for capturing a biometric print to be diminished.

The invention relates to a contactless device for capturing a biometric print, said device comprising a user region and an electronic compartment, the user region being suitable for receiving a hand portion of a user in a positioning plane according to an orientation vector of the hand, the electronic compartment comprising lighting means and an image-acquiring device that is able to acquire an image of a biometric print of said hand portion of the user, characterized in that the image-acquiring device is oriented along an optical axis making a first angle to the orientation vector and in that the lighting means comprise a light source oriented along a lighting axis such that the projection of said lighting axis in the plane defined by the orientation vector and the optical axis makes a second angle to the orientation vector, the first angle being smaller than or equal to eighty degrees, the second angle being a value chosen from a predefined interval comprising an upper limit equal to eighty degrees.

According to one aspect of the invention, the hand portion comprises at least one finger, the user region being suitable for receiving said hand portion of the user so that the direction of said finger corresponds to the direction of the orientation vector, said finger pointing in the direction of said orientation vector.

According to one aspect of the invention, the predefined interval comprises a lower limit equal to ten degrees.

According to one aspect of the invention, the first angle is comprised between forty degrees and seventy-five degrees.

According to one aspect of the invention, the lighting means comprise a plurality of light sources, each light source being oriented along a lighting axis such that the projection of said lighting axis in the plane defined by the orientation vector and the optical axis makes a second angle to the orientation vector, each second angle being a value chosen from the predefined interval.

According to one aspect of the invention, the light sources of the plurality of light sources are placed at equal distance from the image-acquiring device.

According to one aspect of the invention, the positioning plane is inclined with respect to a horizontal plane by a predefined angle of inclination, along an axis of inclination perpendicular to the orientation vector.

According to one aspect of the invention, the difference between the angle of inclination and an angle complementary to the first angle is smaller than ten degrees.

According to one aspect of the invention, the angle of inclination is smaller than ten degrees.

According to one aspect of the invention, the image-acquiring device is able to acquire an image of said hand portion of the user in a focal plane parallel to the positioning plane.

According to one aspect of the invention, the electronic compartment comprises a computer able to correct distortions in an image acquired by the image-acquiring device.

Other advantages and features of the invention will become apparent upon reading the description and the drawings.

FIGS. 1a, 1b and 2 illustrate a device 1 for capturing a biometric print that is able to acquire an image of a print of one hand portion of a user, for example the palm of a hand, one or more fingers of a hand, or the entire hand.

A hand of a user comprises, on its interior surface, a network of ridges and/or valleys that correspond to a biometric print, and wrinkles of the skin in the description below.

The wrinkles are creases in the skin of the fingers or of the palm of a hand, other than interphalangeal creases.

The device 1 for capturing a biometric print allows an image that emphasises said biometric print while decreasing the visibility of the wrinkles of the skin to be generated.

The device 1 for capturing a biometric print comprises a user region 10 and an electronic compartment 20.

Figure 1A:
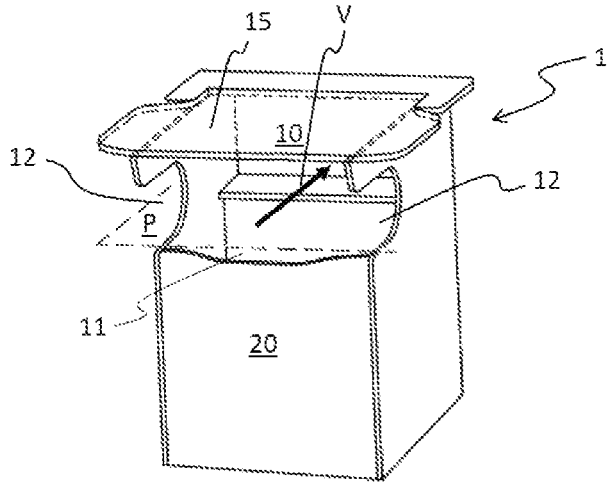
FIG. 1a shows a contactless device for capturing a biometric print according to a first example of embodiment.
Figure 1B:
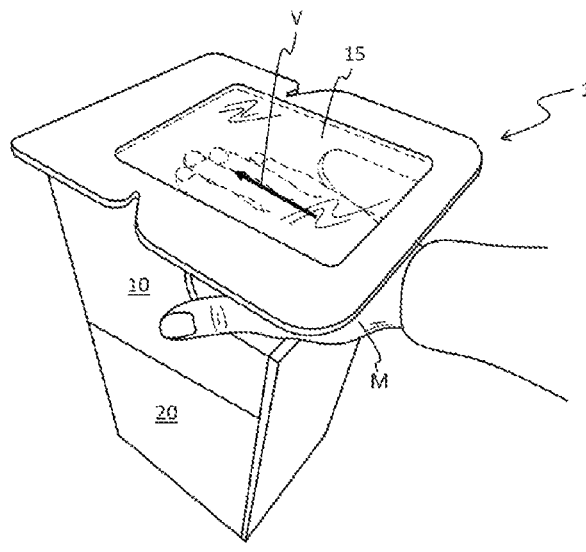
FIG. 1b shows the contactless device for capturing a biometric print of FIG. 1a during use by a user.

According to a first example of embodiment, illustrated in FIGS. 1a and 1b, the user region 10 comprises a user compartment.

The device 1 for capturing a biometric print may comprise a single substantially parallelepipedal unit comprising walls common to the user compartment and to the electronic compartment 20 or indeed be an assembly of a physical user-compartment unit and of a different physical electronic-compartment unit.

The user compartment and the electronic compartment 20 may be partitioned with respect to each other, for example by a separating pane. The separating pane may be located at the junction of two physically different compartments, or be located in one compartment among the user compartment and the electronic compartment 20. The separating pane may advantageously be oriented to limit reflections or facilitate cleaning thereof.

The user compartment and the electronic compartment 20 may open onto each other as shown in FIG. 1*a*, there then being no physical partition therebetween.

The user compartment comprises at least one aperture for passage of the hand portion the biometric print of which must be imaged.

For example, the user compartment comprises a frontal aperture 11 allowing a hand to pass from the end of the fingers to the wrist, in a direction referred to as the longitudinal direction.

For example, the user compartment further comprises two lateral apertures 11 allowing a hand to pass from the thumb to the little finger or from the little finger to the thumb, in a direction referred to as the lateral direction.

FIG. 1*b* illustrates the capturing device of FIG. 1*a* during use by a user. The hand M of the user is positioned in the user region 10 with a view to a biometric acquisition of a hand portion comprising the index finger, the middle finger, the ring finger and the little finger.

Advantageously, said user compartment comprises, on an exterior face 15, a transparent segment in order to allow the user to position the hand portion the biometric print of which must be imaged, in a positioning plane P.

The hand portion the biometric print of which must be imaged must be turned towards the electronic compartment 20.

The electronic compartment 20 comprises lighting means that are able to generate at least one light beam in the direction of the user region 10, and an image-acquiring device 40 that is able to acquire an image of said hand portion of the user.

Figure 2:
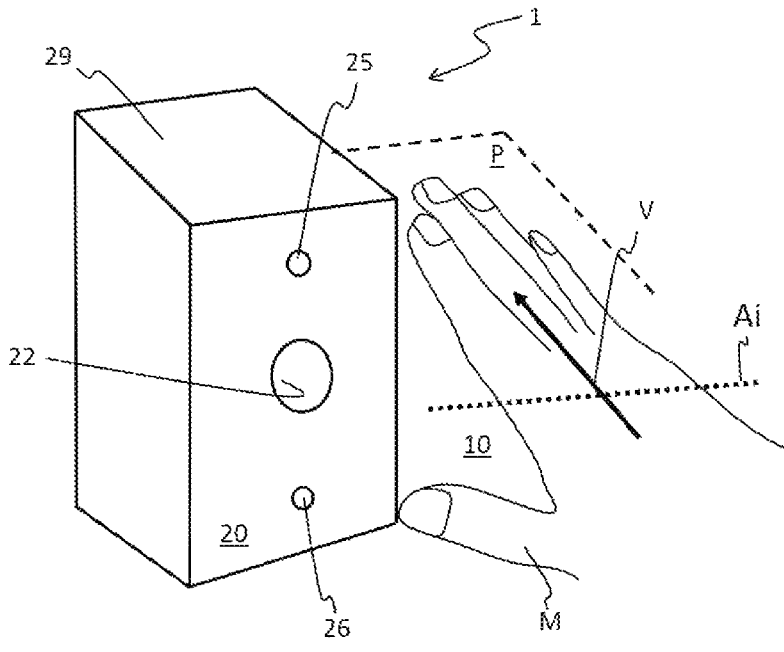
FIG. 2 shows a contactless device for capturing a biometric print according to a second example of embodiment, during use by a user.

According to a second example of embodiment illustrated in FIG. 2, the user region 10 is completely open and is not physically bounded in any way.

The electronic compartment 20 comprises lighting means that are able to generate at least one light beam in the direction of the user region 10, and an image-acquiring device 40 that is able to acquire an image of said hand portion of the user.

The electronic compartment 20 comprises a first orifice 22 allowing an image to be acquired by the image-acquiring device 40, in the direction of the user region 10.

For example, the electronic compartment 20 comprises two second orifices 25, 26 allowing two light beams to pass from the lighting means, to the user region 10. This example is illustrated in FIG. 2 and is non-limiting.

For example, the electronic compartment 20 comprises a ring of second orifices allowing a plurality of light beams to pass from the lighting means, to the user region 10.

For example, the electronic compartment 20 comprises a single second orifice allowing a light beam to pass from the lighting means, to the user region 10.

Whatever the example of embodiment, whether the user compartment is present or not, the user region 10 is suitable for receiving said hand portion of the user in a predetermined positioning plane P and according to a predetermined orientation vector V, with a view to capturing a biometric print via the electronic compartment 20.

For example, the positioning plane P is marked out by a hologram.

For example, the positioning plane P corresponds to the position that the hand portion must adopt to be correctly positioned, correct positioning being validated by the device 1 for capturing a biometric print via a voice message or written message, or via an indicator.

For example, in the case where the user region 10 comprises a user compartment, the positioning plane P is induced by the shape of said user compartment.

For example, the positioning plane P is induced by the characteristics of an exterior face 15 of said user compartment. An inclination of the exterior face 15 induces a positioning plane of same inclination. A horizontal exterior face 15 induces a horizontal positioning plane.

For example, in the case where the user region 10 is completely open, the positioning plane P is induced by the shape or inclination of a face 29 of the electronic compartment 20.

For example, the positioning plane P is horizontal, as illustrated in FIG. 1*a*.

For example, the positioning plane P is inclined with respect to a horizontal plane along an axis of inclination Ai perpendicular to the orientation vector V.

For example, the positioning plane P is inclined such that the orientation vector V is oriented upwards, as illustrated in FIG. 2.

Figure 3A:
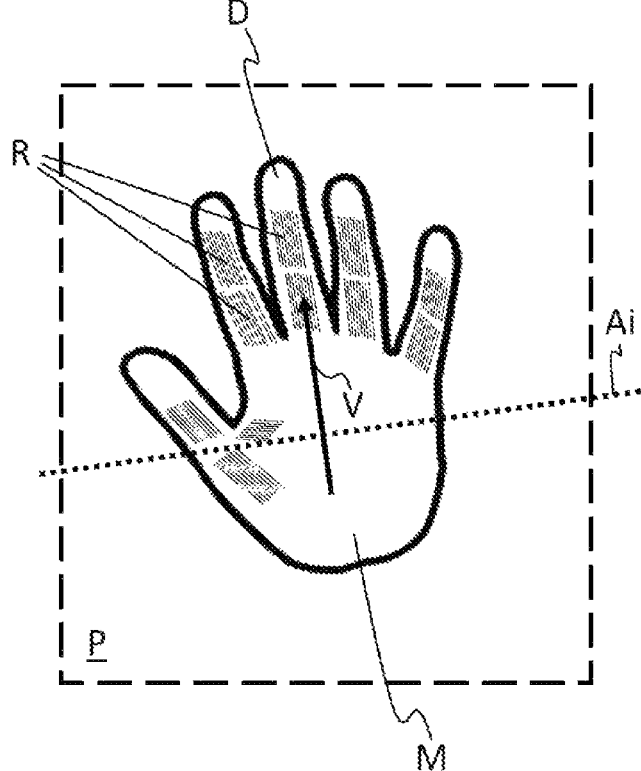
FIG. 3a shows the hand of a user in a positioning plane of a capturing device and according to an orientation vector, seen from below.
Figure 3B:
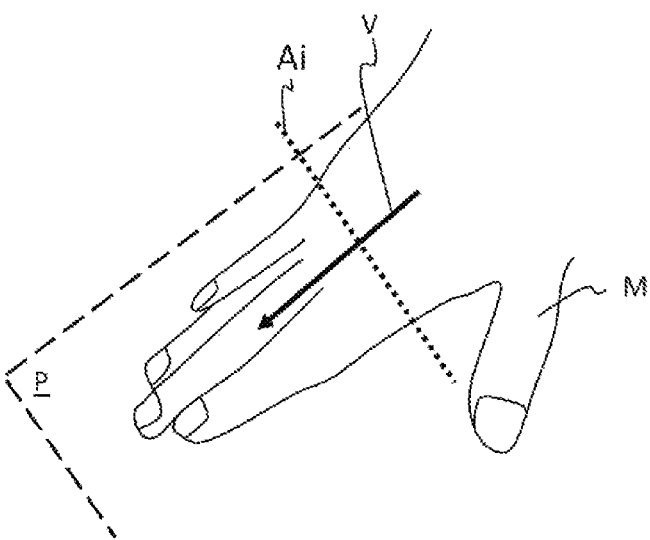
FIG. 3b shows the hand of a user in a positioning plane of a capturing device and according to an orientation vector, in perspective.

For example, the positioning plane P is inclined such that the orientation vector V is oriented downwards, as illustrated in FIG. 3*b*.

FIG. 3*a* illustrates a hand, seen from below, located in the positioning plane P and oriented according to the orientation vector V.

The hand comprises wrinkles R.

The wrinkles R of the fingers D are mainly oriented, for each finger D, in a longitudinal direction of said finger D.

The orientation of the wrinkles R of the palm of the hand is less uniform.

FIG. 3*b* illustrates a perspective view of a hand located in the positioning plane P and oriented according to the orientation vector V.

The positioning plane P is inclined with respect to a horizontal plane along an axis of inclination Ai perpendicular to the orientation vector V. The orientation vector V belonging to the positioning plane P is oriented downwards.

The aim of the invention is to provide an arrangement of the image-acquiring device and of the lighting means, within the electronic compartment 20, allowing an image of a print of a hand portion to be acquired while diminishing the wrinkles R of said hand portion, when said hand portion is positioned in the positioning plane P of the associated capturing device 1, according to the orientation vector V of the hand.

FIGS. 4, 5, 6 and 7 illustrate a plurality of embodiments of the capturing device 1 according to the invention.

Whatever the embodiment, for the effect of wrinkle diminution to be significant, the arrangement must be such that:

the image-acquiring device 40 is oriented along an optical axis A1 making a first angle B1 to the orientation vector V, the lighting means comprise a light source 31 that is oriented along a lighting axis A31 such that the projection PA31 of said lighting axis A31 in the plane defined by the orientation vector V and the optical axis A1 makes a second angle B31 to the orientation vector V, the first angle B1 is smaller than or equal to eighty degrees, the second angle B31 has a value chosen from a predefined interval comprising an upper limit equal to eighty degrees.

Thus, just like the first angle B1, the second angle B31 is smaller than or equal to eighty degrees.

The second angle B31 is defined to lie in a predefined interval to facilitate below introduction of an advantageous case whereby said second angle is far from zero. This also makes it possible not to confuse constraints associated with the first and second angles B1, B31.

Specifically, the predefined interval advantageously comprises a lower limit equal to ten degrees. This avoids the risk of lighting the positioning plane P from above, the underneath of the positioning plane P being the portion facing the electronic compartment 20.

Therefore, according to this advantageous case, the second angle B31 is smaller than or equal to eighty degrees, and is larger than or equal to ten degrees. In other words, the second angle B31 is comprised between ten degrees and eighty degrees.

Preferably, the first angle B1 is comprised between forty degrees and seventy-five degrees.

In the plane defined by the orientation vector V and the optical axis A1, the orientation vector V has a normal N that separates the user compartment into a first portion comprising the projection of the image-acquiring device 40 and lighting means and a second portion devoid of the projection of the image-acquiring device 40 and the lighting means.

For the effect of wrinkle diminution to be significant, it is necessary for the lighting means to emit light rays that, when they strike a wrinkle R, are mainly reflected towards the second portion of the user compartment, the image-acquiring device 40 therefore not receiving them. In contrast, it is necessary for the lighting means to emit light rays that, when they strike a ridge of a biometric print, are reflected towards the first portion of the user compartment, and in particular mainly reflected towards the image-acquiring device 40. The arrangement described above allows the sought-after effect to be achieved.

The lighting means may comprise a single light source 31 or a plurality of light sources 31, 32.

A light source 31, 32 may be an areal or point light source.

A light source 31, 32 may have a large or concentrated beam angle.

When the lighting means comprise a plurality of light sources, each light source 31, 32 is oriented along a lighting axis A31, A32 such that the projection PA31, PA32 of said lighting axis A31, A32 in the plane defined by the orientation vector V and the optical axis A1 makes a second angle B31, B32 to the orientation vector V, each second angle B31, B32 being a value chosen from the predefined interval.

For example, the second angles are equal to each other.

For example, the light sources 31, 32 are placed at equal distance from the image-acquiring device 40.

For example, the light sources 31, 32 are placed in a ring around the image-acquiring device 40.

The capturing device 1 may comprise an additional image-capturing device, for example in order to allow a computer of the electronic compartment 20 to generate a three-dimensional reconstruction of the hand portion of the user.

Advantageously, the image-capturing device 40 is able to acquire an image of a hand portion of a user in a focal plane parallel to the positioning plane P.

The image-acquiring device 40 comprises an objective and a sensor.

The sensor comprises the photosensitive surface of the image-acquiring device.

For example, the objective is inclined with respect to the optical axis of the image-acquiring device.

For example, the sensor is inclined with respect to the optical axis.

For example, the sensor is off-centre with respect to the objective.

Advantageously, the electronic compartment 10 comprises a computer able to correct distortions in an image acquired by the image-acquiring device 40.

Figure 4:
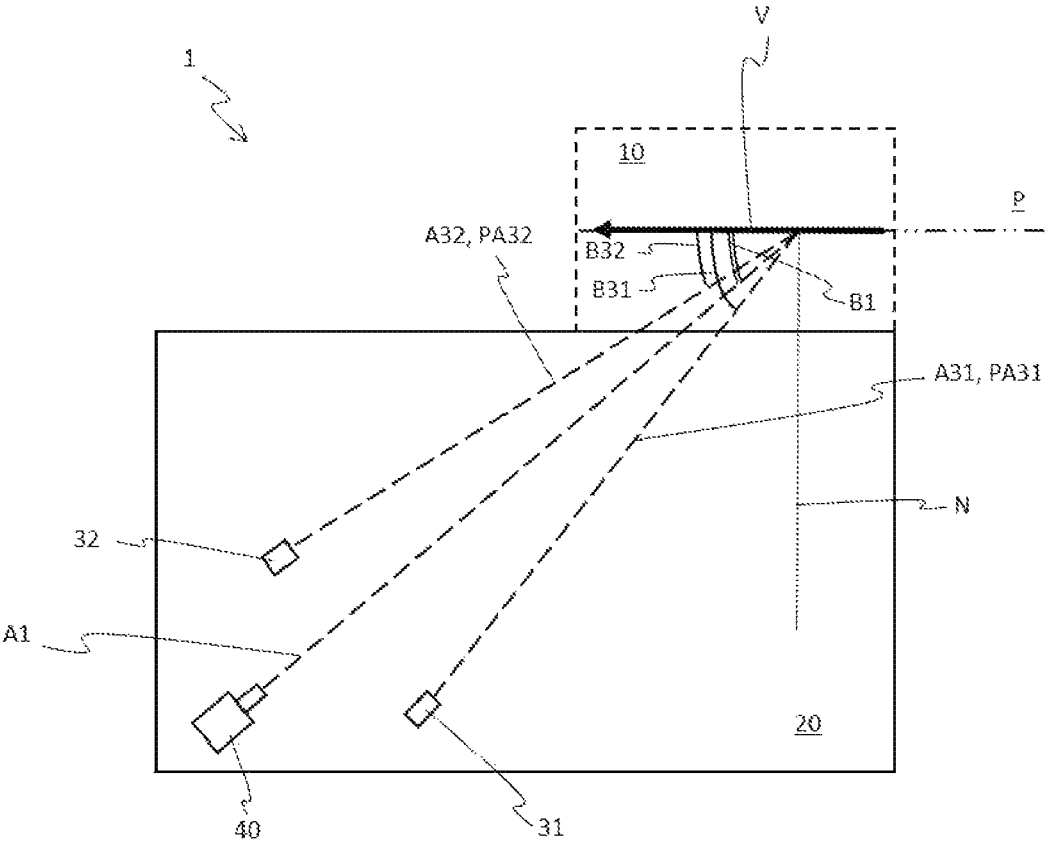
FIG. 4 shows a device for capturing a biometric print according to one embodiment of horizontal expanse.

According to one embodiment of horizontal expanse illustrated in FIG. 4, the positioning plane P is substantially horizontal. The positioning plane P is inclined with respect to a horizontal plane, by an angle of inclination B2 smaller than ten degrees, along an axis of inclination Ai perpendicular to the orientation vector V. The lighting axis A1 of the image-acquiring device 40 is said to be oblique.

The embodiment of horizontal expanse is for example suitable for acquiring the print of a driver or of a passenger of a vehicle.

The capturing device 1 of FIG. 4 comprises no user compartment. The user region 10 has been bounded by dashed lines.

This example is non-limiting. A capturing device 1 according to the embodiment of horizontal expanse may comprise a user compartment.

In FIG. 4, the lighting means comprise a first light source 31 and a second light source 32. For practical reasons of illustration, the image-acquiring device 40 and the light sources 31, 32 are located in the plane defined by the orientation vector V and the optical axis A1 such that the lighting axes A31, A32 of the light sources 31, 32 and the optical axis A1 belong to the same plane. Thus, the lighting axis A31 of the first light source 31 is coincident with its projection PA31 in the plane defined by the orientation vector V and the optical axis A1. Likewise, the lighting axis A32 of the second light source 32 is coincident with its projection PA32 in the plane defined by the orientation vector V and the optical axis A1.

This example is non-limiting. A capturing device 1 according to the embodiment of horizontal expanse may comprise lighting means comprising a single light source 31 or more than two light sources. The lighting means need not be located in the plane defined by the orientation vector V and the optical axis A1.

Figure 5:
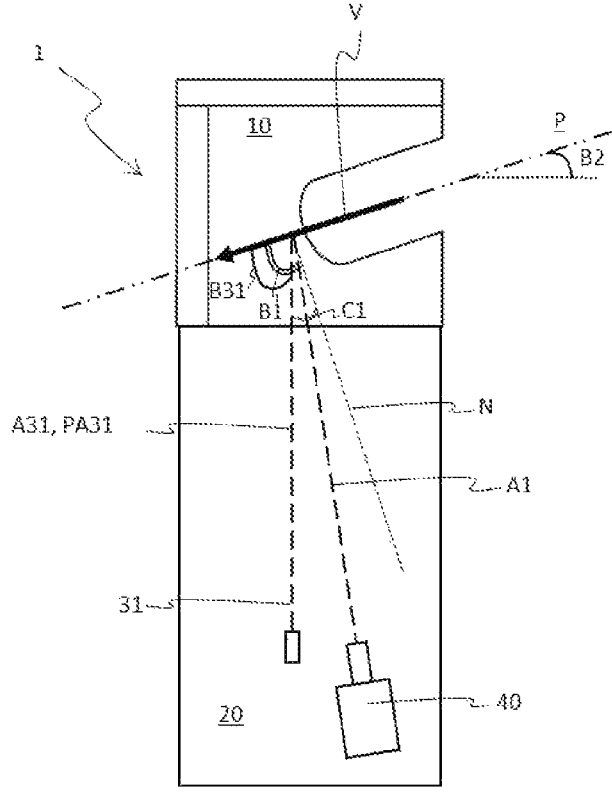
FIG. 5 shows a device for capturing a biometric print according to one embodiment of vertical expanse and according to a first variant.
Figure 6:
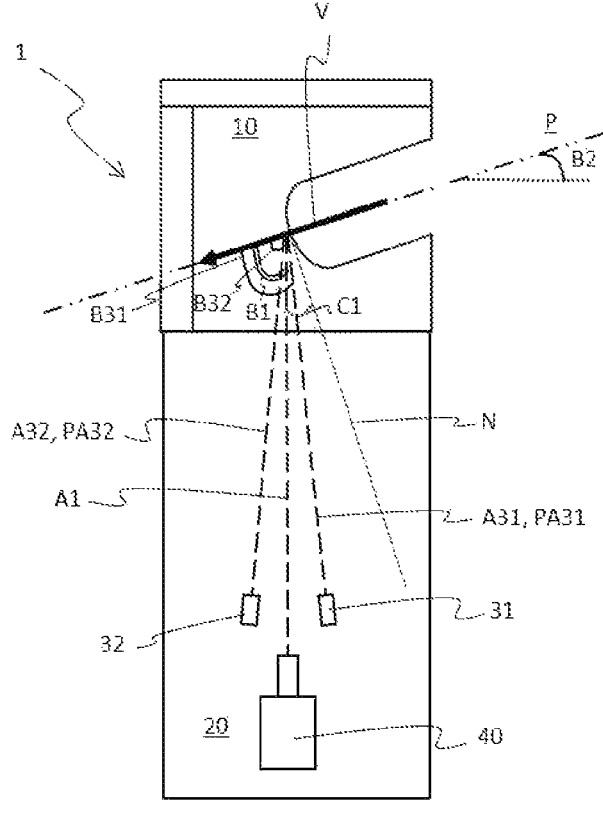
FIG. 6 shows a device for capturing a biometric print according to one embodiment of vertical expanse and according to a second variant.

According to one embodiment of vertical expanse illustrated in FIGS. 5 and 6, the optical axis A1 of the image-acquiring device 40 is substantially vertical. The positioning plane P is inclined with respect to a horizontal plane by an angle of inclination B2 such that the difference between the angle of inclination B2 and an angle C1 complementary to the first angle B1 is smaller than ten degrees.

A device such as shown in FIGS. 1a and 1b is for example suitable for the embodiment of vertical expanse.

The embodiment of vertical expanse is for example suitable for acquiring the print of a user in standing position, for example at the entrance of a restricted access zone such as a building or one portion of a building.

The capturing device 1 of FIGS. 5 and 6 comprises a user compartment bounding the user region 10.

This example is non-limiting. A capturing device 1 according to the embodiment of vertical expanse need not comprise a user compartment.

According to a first variant illustrated in FIG. 5, the lighting means comprise one light source 31. For practical reasons of illustration, the image-acquiring device 40 and the light source 31 are located in the plane defined by the orientation vector V and the optical axis A1 such that the lighting axis A31 of the light source 31 and the optical axis A1 belong to the same plane. Thus, the lighting axis A31 of the first light source 31 is coincident with its projection PA31 in the plane defined by the orientation vector V and the optical axis A1.

According to a second variant illustrated in FIG. 6, the lighting means comprise a first light source 31 and a second light source 32. For practical reasons of illustration, the image-acquiring device 40 and the light sources 31, 32 are located in the plane defined by the orientation vector V and the optical axis A1 such that the lighting axes A31, A32 of the light sources 31, 32 and the optical axis A1 belong to the same plane. Thus, the lighting axis A31 of the first light source 31 is coincident with its projection PA31 in the plane defined by the orientation vector V and the optical axis A1. Likewise, the lighting axis A32 of the second light source 32 is coincident with its projection PA32 in the plane defined by the orientation vector V and the optical axis A1.

These examples are non-limiting. A capturing device 1 according to the embodiment of vertical expanse may comprise lighting means comprising more than two light sources. The lighting means need not be located in the plane defined by the orientation vector V and the optical axis A1.

Figure 7:
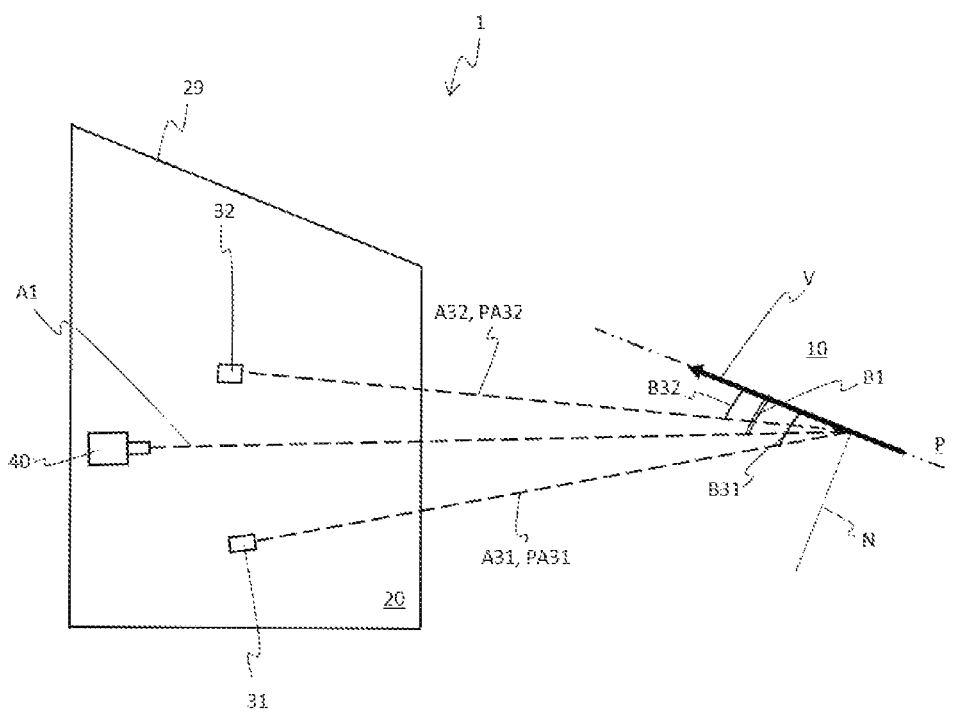
FIG. 7 shows a device for capturing a biometric print according to one compact embodiment.

According to one compact embodiment, illustrated in FIG. 7, the optical axis A31 is substantially horizontal. The capturing device 1 comprises no user compartment. The positioning plane P is inclined with respect to a horizontal plane by an angle of inclination B2 such that the difference between the angle of inclination B2 and the first angle B1 is smaller than ten degrees.

A device such as shown in FIG. 2 is for example suitable for the compact embodiment.

In FIG. 7, the lighting means comprise a first light source 31 and a second light source 32. For practical reasons of illustration, the image-acquiring device 40 and the light sources 31, 32 are located in the plane defined by the orientation vector V and the optical axis A1 such that the lighting axes A31, A32 of the light sources 31, 32 and the optical axis A1 belong to the same plane. Thus, the lighting axis A31 of the first light source 31 is coincident with its projection PA31 in the plane defined by the orientation vector V and the optical axis A1. Likewise, the lighting axis A32 of the second light source 32 is coincident with its projection PA32 in the plane defined by the orientation vector V and the optical axis A1.

This example is non-limiting. A capturing device 1 according to the compact embodiment may comprise lighting means comprising a single light source 31 or more than two light sources, these for example being placed in a ring around the image-acquiring device 40. The lighting means need not be located in the plane defined by the orientation vector V and the optical axis A1.

The compact embodiment is for example suitable for nomadic acquisition of a print of a user, for example by law enforcement officers, with a view to use anywhere.

There are a number of possibilities in respect of embodiment of the capturing device 1, which are combinable with one another independently:

the user region 10 may or may not be bounded by a user compartment, the electronic compartment 20 comprises one or more light sources 31, 32, the electronic compartment 20 may or may not comprise an additional image-acquiring device, the optical axis A31 of the image-acquiring device 40 is substantially horizontal, vertical or oblique.

Some of these combinations have been described and are illustrated in this document. Anyone skilled in the art will be able to produce the others without difficulty.

The capturing device of the invention may be used to acquire a hand portion comprising one or more fingers D, and for example to acquire one finger D, a plurality of fingers D, a complete hand.

The user region 10 is suitable for receiving said hand portion of the user comprising at least one finger D in such a way that the direction of said finger D corresponds to the direction of the orientation vector V, said finger D pointing in the direction of said orientation vector V as for example illustrated in FIGS. 1b, 2, 3a and 3b.

When the hand is positioned in the user region 10 with a view to acquiring a biometric-print image, the orientation vector V passes through a finger D of the hand and is oriented from the palm of the hand to a free end of said finger D (the end generally comprising a nail).

The capturing device of the invention may be used to acquire the palm of a hand. Since the wrinkles of a palm of a hand are oriented less uniformly than the wrinkles of a finger, it is advantageous to perform a number of acquisitions with a number of orientation vectors V in order to diminish, in the acquired images, wrinkles oriented very differently to one another.

For example, processing, by selective fusion, the various images using a computer allows, from said images, a palm image in which the wrinkles are diminished, whatever their orientation, to be generated.

Regarding the ergonomics of the acquisition by the capturing device, mention may be made of three modes of use.

Figure 8A:
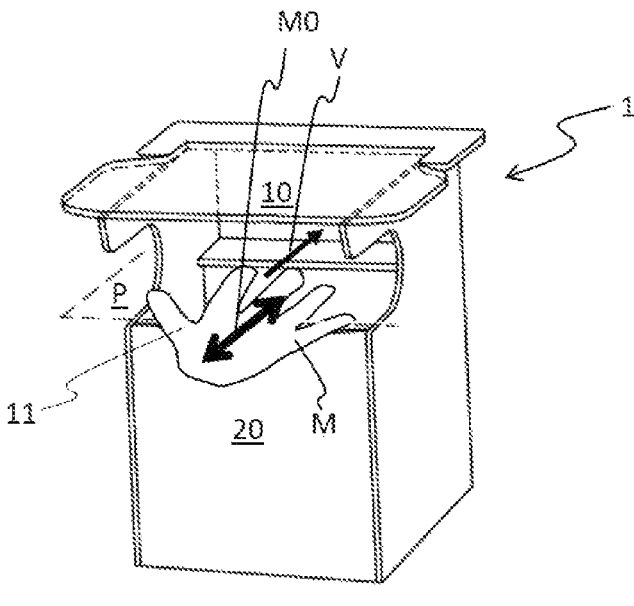
FIG. 8a shows a device for capturing a biometric print being used in a first mode of use.

In a first mode of use illustrated in FIG. 8a, the acquisition by the image-acquiring device 40 of the capturing device 1 is achieved while the user is introducing his hand portion into the user region 10 in a longitudinal direction extending from the wrist to an end of the fingers.

For example, the user region 10 is suitable for receiving a hand portion comprising at least one finger D in such a way that the direction of said finger D corresponds to the direction of the orientation vector V, said finger D pointing in the direction of said orientation vector V. In this example, the hand, to enter and exit the user region 10, makes a there-and-back movement M0 substantially parallel to the orientation vector V, in the positioning plane P.

Devices produced according to the vertical or horizontal embodiment are well suited to the first mode of use.

Figure 8B:
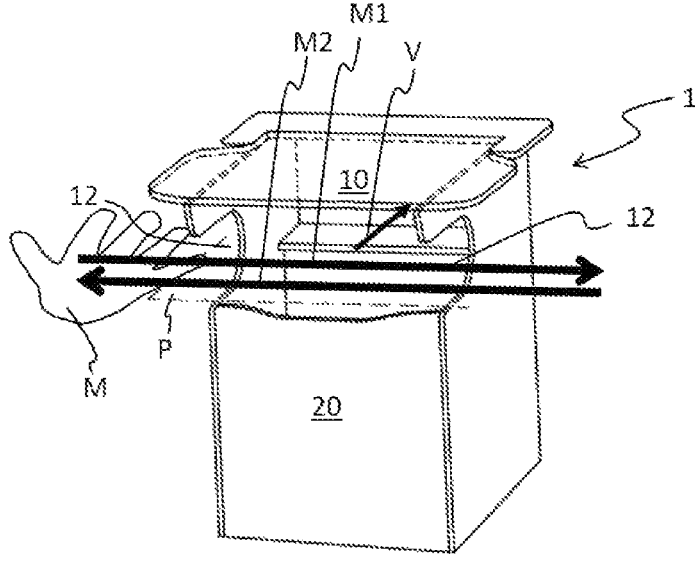
FIG. 8b shows a device for capturing a biometric print being used in a second mode of use.

In a second mode of use illustrated in FIG. 8b, the acquisition by the image-acquiring device 40 of the capturing device 1 is achieved while the user is introducing his hand portion into the user region 10 in a lateral direction extending from the thumb to the little finger.

For example, the user region 10 is suitable for receiving a hand portion comprising at least one finger D in such a way that the direction of said finger D corresponds to the direction of the orientation vector V, said finger D pointing in the direction of said orientation vector V. In this example, the movement that the hand makes to enter and exit the user region follows a movement vector M1, M2 substantially perpendicular to the orientation vector V, in the positioning plane P.

Devices produced according to the vertical or horizontal embodiment are well suited to the second mode of use.

Figure 8C:
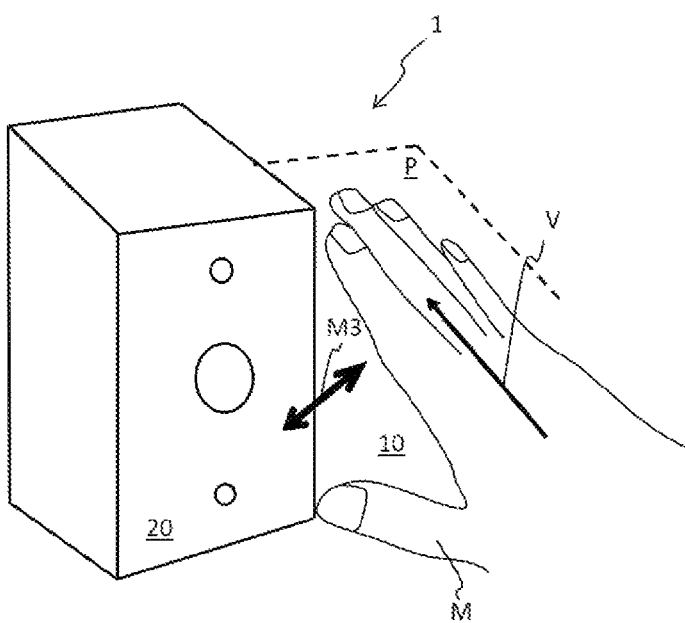
FIG. 8c shows a device for capturing a biometric print being used in a third mode of use.

According to a third mode of use, illustrated in FIG. 8c, the acquisition by the image-acquiring device 40 is achieved while the user approaches and removes his hand from the electronic compartment 20 of the capturing device 1 via a movement M3 in a direction perpendicular to the positioning plane P, said hand being positioned in the positioning plane P within the user region 10 at some point during said movement.

In this embodiment, the user must be adequately guided, for example by an operator.

Devices produced according to the compact embodiment are well suited to the third mode of use.

More generally, devices without a user compartment are well suited to the third mode of use.

The invention claimed is:

1. A contactless device for capturing a biometric print, the contactless device comprising:

a user region; and an electronic compartment, wherein the user region is suitable for receiving a hand portion of a user in a positioning plane according to an orientation vector of a hand, wherein the electronic compartment includes lighting means and an image-acquiring device that is able to acquire an image of a biometric print of the hand portion of the user, wherein the image-acquiring device is oriented along an optical axis making a first angle to the orientation vector, wherein the lighting means includes a light source oriented along a lighting axis such that a projection of the lighting axis in a plane defined by the orientation vector and the optical axis makes a second angle to the orientation vector, and wherein the first angle is smaller than or equal to eighty degrees and the second angle is a value chosen from a predefined interval comprising an upper limit equal to eighty degrees, wherein the positioning plane is inclined with respect to a horizontal plane by a predefined angle of inclination along an axis of inclination perpendicular to the orientation vector, and wherein a difference between the predefined angle of inclination and an angle complementary to the first angle is smaller than ten degrees.

2. The contactless device according to claim 1, wherein the hand portion includes at least one finger, the user region being suitable for receiving the hand portion of the user so that a direction of the at least one finger corresponds to a direction of the orientation vector, the at least one finger pointing in the direction of the orientation vector.

3. The contactless device according to claim 1, wherein the predefined interval includes a lower limit equal to ten degrees.

4. The contactless device according to claim 1, wherein the first angle is between forty degrees and seventy-five degrees.

5. The contactless device according to claim 1, wherein the lighting means includes a plurality of light sources, each of the plurality of light sources being oriented along a lighting axis such that the projection of each lighting axis in the plane defined by the orientation vector and the optical axis makes a second angle to the orientation vector, each second angle being a value chosen from the predefined interval.

6. The contactless device according to claim 1, wherein the predefined angle of inclination is smaller than ten degrees.

7. The contactless device according to claim 1, wherein the image-acquiring device is able to acquire the image of the hand portion of the user in a focal plane parallel to the positioning plane.

8. The contactless device according to claim 1, wherein the electronic compartment includes a computer able to correct distortions in the image acquired by the image-acquiring device.

9. The contactless device according to claim 2, wherein the predefined interval includes a lower limit equal to ten degrees.

10. The contactless device according to claim 2, wherein the first angle is between forty degrees and seventy-five degrees.

11. The contactless device according to claim 2, wherein the lighting means includes a plurality of light sources, each of the plurality of light sources being oriented along a lighting axis such that the projection of each lighting axis in the plane defined by the orientation vector and the optical axis makes a second angle to the orientation vector, each second angle being a value chosen from the predefined interval.

12. The contactless device according to claim 2, wherein the positioning plane is inclined with respect to a horizontal plane by a predefined angle of inclination along an axis of inclination perpendicular to the orientation vector.

13. The contactless device according to claim 2, wherein the image-acquiring device is able to acquire the image of the hand portion of the user in a focal plane parallel to the positioning plane.

14. The contactless device according to claim 2, wherein the electronic compartment includes a computer able to correct distortions in the image acquired by the image-acquiring device.

15. The contactless device according to claim 3, wherein the first angle is between forty degrees and seventy-five degrees.

16. The contactless device according to claim 3, wherein the lighting means includes a plurality of light sources, each of the plurality of light sources being oriented along a lighting axis such that the projection of each lighting axis in the plane defined by the orientation vector and the optical axis makes a second angle to the orientation vector, each second angle being a value chosen from the predefined interval.

17. The contactless device according to claim 3, wherein the positioning plane is inclined with respect to a horizontal plane by a predefined angle of inclination along an axis of inclination perpendicular to the orientation vector.

18. The contactless device according to claim 3, wherein the image-acquiring device is able to acquire the image of the hand portion of the user in a focal plane parallel to the positioning plane.

* * * * *